United States Patent [19]

Fujimura et al.

[11] Patent Number: 4,786,987
[45] Date of Patent: Nov. 22, 1988

[54] ELECTRONIC CAMERA WITH AUTOFOCUS WARNING DEVICE

[75] Inventors: Ikuo Fujimura; Mikio Utsugi, both of Minato, Japan

[73] Assignee: Fuji Photo Film Co., Ltd., Kanagawa, Japan

[21] Appl. No.: 918,909

[22] Filed: Oct. 15, 1986

[30] Foreign Application Priority Data

Oct. 19, 1985 [JP] Japan ............................ 60-160031[U]
Oct. 19, 1985 [JP] Japan ............................ 60-160032[U]
Oct. 19, 1985 [JP] Japan ............................ 60-160033[U]
Oct. 19, 1985 [JP] Japan ............................ 60-160034[U]

[51] Int. Cl.$^4$ .......................................... H04N 5/781
[52] U.S. Cl. .................................... 360/35.1; 358/906; 358/909; 358/227; 354/409
[58] Field of Search ............... 358/906, 909, 335, 227; 360/35.1, 33.1; 354/409, 402, 400

[56] References Cited

U.S. PATENT DOCUMENTS

| | | | |
|---|---|---|---|
| 4,358,190 | 11/1982 | Sakai | 354/409 |
| 4,367,463 | 1/1983 | Suzuki | 354/409 |
| 4,472,742 | 9/1984 | Hosegawa | 358/906 |
| 4,511,932 | 4/1985 | Ushiro | 358/906 |
| 4,512,646 | 4/1985 | Kitaura | 354/409 |
| 4,544,959 | 10/1985 | Kozuki | 358/906 |
| 4,545,665 | 10/1985 | Aihara | 354/409 |

*Primary Examiner*—Alan Faber
*Attorney, Agent, or Firm*—Parkhurst, Oliff & Berridge

[57] ABSTRACT

A camera wherein a subject to be taken is pure-electronically still-photographed and recorded, and an image is reproduced by a television system and a printer. Resolution of the camera of this type is lower than that of the ordinary cameras. Accordingly, during the portrait photographing, it is necessary that the ratio of the face occupying in the taking background is made to be beyond a predetermined value. Then, when the taking distance is beyond a predetermined value, a warning is issued to call a photographer's attention to a close-in taking or automatically zoom-up.

11 Claims, 10 Drawing Sheets

ELECTRONIC CAMERA WITH AUTOFOCUS WARNING DEVICE

BACKGROUND OF THE INVENTION

1. FIELD OF THE INVENTION

This invention relates to a camera having a function of automatically taking a close-up of a person in portrait mode photographing.

2. DESCRIPTION OF THE PRIOR ART

Recently, there has been developed an electronic still camera system wherein an image pickup device such as a solid state image sensing device or an image pickup tube is combined with a recording device using a magnetic disc inexpensive as a recording medium and yet having a comparative high memory capacity. A subject is still-photographed electronically and recorded into a rotating magnetic disc, and the reproduction of an image is carried out by a television, a printer or the like, which are provided separately. The above-described camera system has become the object of public attention.

Now, the following disadvantage has been found in the electronic still camera of the type described because of the construction thereof. Namely, in the electronic still camera, the degree of integration of the charge coupled device (CCD) for image-sensing a subject to be taken is still low even with the current technique of forming the integrated circuits, and the resolution of the image is unsatisfactory. Since reproduction of the sensed image is performed through a television (hereinafter referred briefly to as "TV"), the resolution of the image influences the number of picture elements and the number of scanning lines of the TV screen. Because of this, in photographing by use of the electronic still camera, it is necessary to pay sufficient consideration to the size of the subject to be taken, as will be described hereunder.

In general, the ratio of a face to the space it occupies in the photographic background in the case of photographing a portrait develops the following tendency. More specifically, FIG. 3 shows a photo print, in which L indicates the longitudinal dimension of the photo print and H the size of a face, respectively. FIG. 14 is a chart, wherein a ratio H/L, at which the face occupies a space in a photo print in general is given as an abscissa and a frequency, at which the ratio H/L occurs, is given as an ordinate. As apparent from the drawing, in general, amateur cameramen tend to take in a person as a whole in the photo copy when the subject to be taken is a person. As a result, the highest frequency occurs when the abscissa H/L is about 0.1. However, at the time of photographic printing, a silver salt film of fine grain structure is used as a recording medium, so that an image printed on a photographic printing paper is good in resolution and sharply taken, thus presenting no problem.

In contrast thereto, in a method of reproducing a sensed image on a TV screen, e.g. TV broadcasting, the following contrivance in photographing is made. FIG. 15 shows an ordinary TV screen. In the drawing, L indicates the size of screen in the longitudinal direction, and H the size of a face, respectively. FIG. 16 is a chart, wherein the ratio H/L, at which a face of an image of a person delivered from a TV broadcasting station occupies a space in the TV screen shown in FIG. 7, is given as an abscissa and a frequency, at which the rates H/L occur, is given as an ordinate. The drawing show that the highest frequency occurs when H/L is about 0.3. As described above, when the subject to be taken is a person in a TV image, to improve the resolution of the sensed image and make the sensed image easy in looking at, it is found that, the face portion is photographed and broadcasted so as to occupy about 30% of the TV screen.

As shown above, when the subject to be taken is a person, if photographing is made by use of the electronic still camera with the feeling of photographing by a camera using an ordinary silver salt film, then, when, the sensed image is reproduced on the TV screen so as to photograph the face to be small, the resolution is lowered, thus presenting a problem that the face cannot be distinguished.

As a consequence, to photograph a person by use of an electronic still camera, it is designable to use an electronic still camera having a function of automatically taking a closeup.

Recently, a so-called TV photo system has been utilized, in which the subject photographed by a camera on a negative, a print or the like is recorded and stored in a magnetic disc for an electronic camera, reproduced as necessary, and displayed on a TV screen for enjoying.

Even with this system, it is necessary to take a closeup.

Further, with a film having a small number of picture elements, such as a 110 film and a disc film, is used it is preferable to take a close-up when a person is photographed.

SUMMARY OF THE INVENTION

An object of the present invention is to provide a camera having a function of calling a photographer's attention to a close-in taking when a subject to be taken is positioned at a far-away distance during the portrait photographing.

Another object of the present invention is to provide a camera having a function of automatically performing a zoom taking when the subject to be taken is positioned at a far-away distance during the portrait photographing.

To achieve the above-described objects, the present invention contemplates a camera comprising: distance measuring means for measuring a distance to the subject to be taken; and a mechanism for automatically focusing a taking lens in response to an output signal from the distance measuring means; wherein said camera further comprises warning means to issue a warning in response to a measuring signal from the distance measuring means when the taking distance is beyond a predetermined value.

Furthermore, another aspect of the present invention contemplates a camera comprising: an optical finder for ascertaining a scope for taking the subject to be taken; distance measuring means for measuring a distance to the subject; and an optical system including a mechanism for automatically focusing the taking lens in response to an output signal from the distance measuring means; wherein the taking lens comprises zoom lenses, and the camera further comprises control means for zoom-up driving a zoom lens mechanism in response to a measuring signal from the distance measuring means when the taking distance is beyond a predetermined value.

DESCRIPTION OF THE PREFERRED EMBODIMENT

Figure 1:
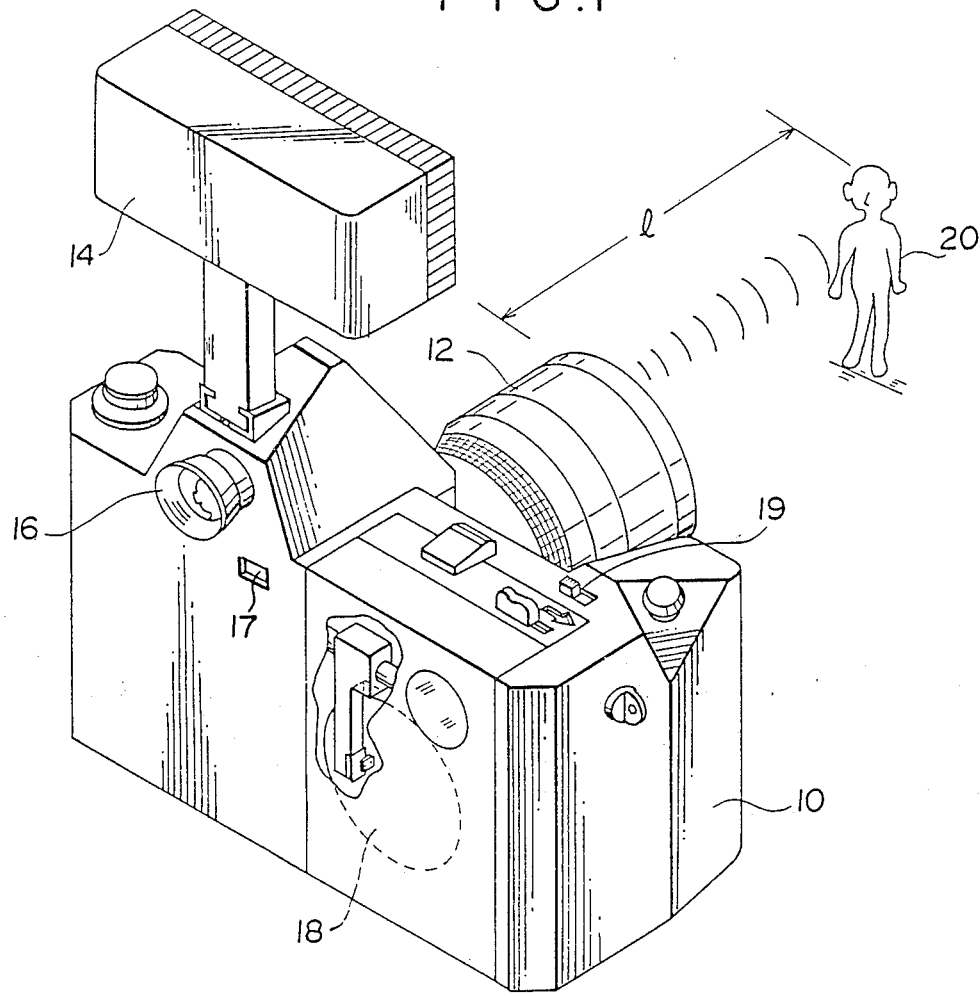
FIG. 1 is a perspective view showing the outer appearance and a use example of the electronic still camera embodying the present invention.

FIG. 1 shows the outer appearance and a use example of the electronic still camera embodying the present invention. In the drawing, designated at 10 is a main body of the electronic still camera, 12 a taking lens, 14 a strobe light emitting section, (or flash) 16 a finder, 17 a warning issuing section and 18 a magnetic disc as a recording medium for an image, respectively. Furthermore, the electronic still camera is spaced about a distance apart from a subject 20 to be taken, and the distance to the subject is accurately measured by a well known auto-focus technique, whereby automatic focusing of the image is performed on the basis of the measured result, and at the same time, far-and-near distance information as to whether the subject is positioned beyond a predetermined distance is indicated through a warning lamp. Additionally, in the electronic still camera, the portrait mode can be switched to the normal mode or vice versa. The portrait mode will hereunder be described.

Figure 2:
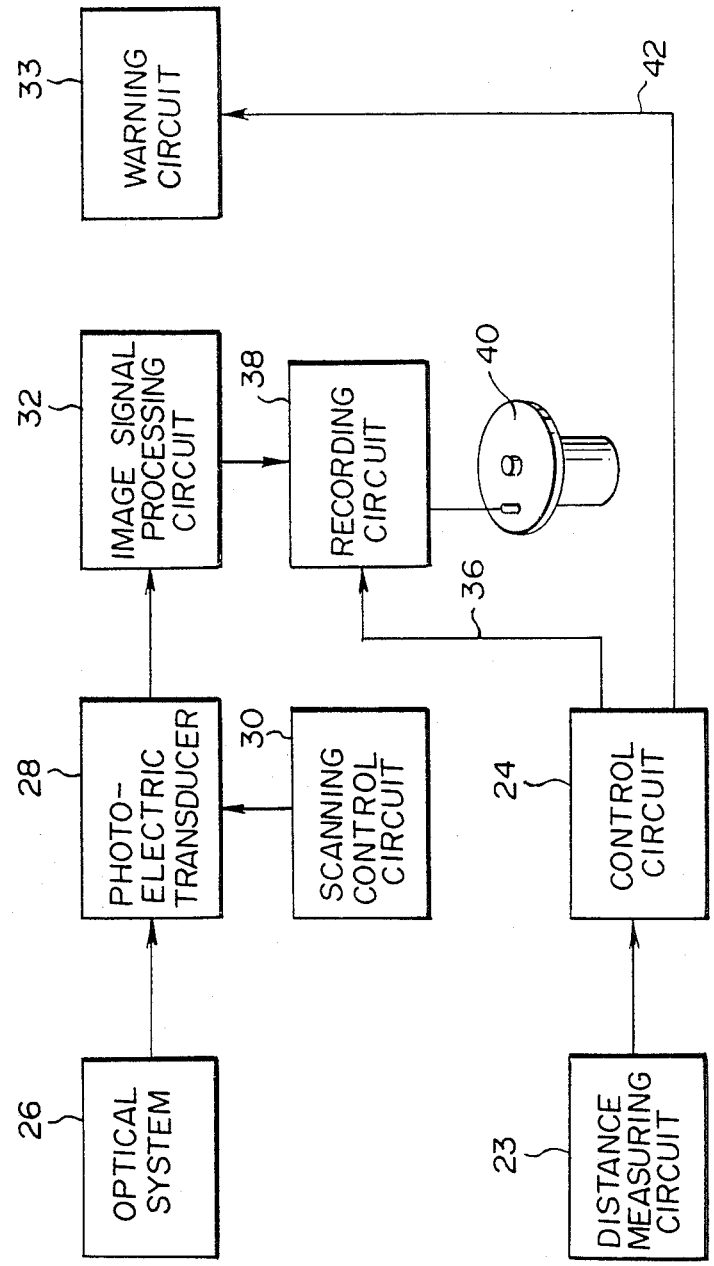
FIG. 2 is a block diagram showing one embodiment of the outlined electric circuit of the electronic still camera shown in FIG. 1.

The outline of action of the electronic still camera will hereunder be described with reference to FIG. 2. FIG. 2 is a block diagram showing the outline of the electric circuit of the electronic still camera shown in FIG. 1. In the drawing, denoted at 23 is a distance measuring circuit for measuring a distance from a point of taking to the subject to be taken. An image of the subject is formed on the surface of a charge coupled device (CCD) of a photo-electric transducer 28 by an automatically focusing mechanism, not shown, operable in synchronism with an output signal, not shown, from the distance measuring circuit 23 formed integrally with an optical system 26, and recorded as a still image of an electric charge pattern. Further, the charge pattern formed in the charge coupled device is scanned by a scanning control circuit 30, and the scanned result is converted into an image signal in an image signal processing circuit 32. Subsequently, when the distance to the subject is within a predetermined value, a recording circuit 38 receives an output signal 36 from a control circuit 24, and further, signal-processes this image signal, which is magnetically recorded onto a magnetic disc 40. Furthermore, when the distance to the subject is beyond the predetermined value, a warning circuit 33 receives a warning signal 42 outputted from the control circuit to light up a warning lamp, thus calling a photographer's attention.

Figure 3:
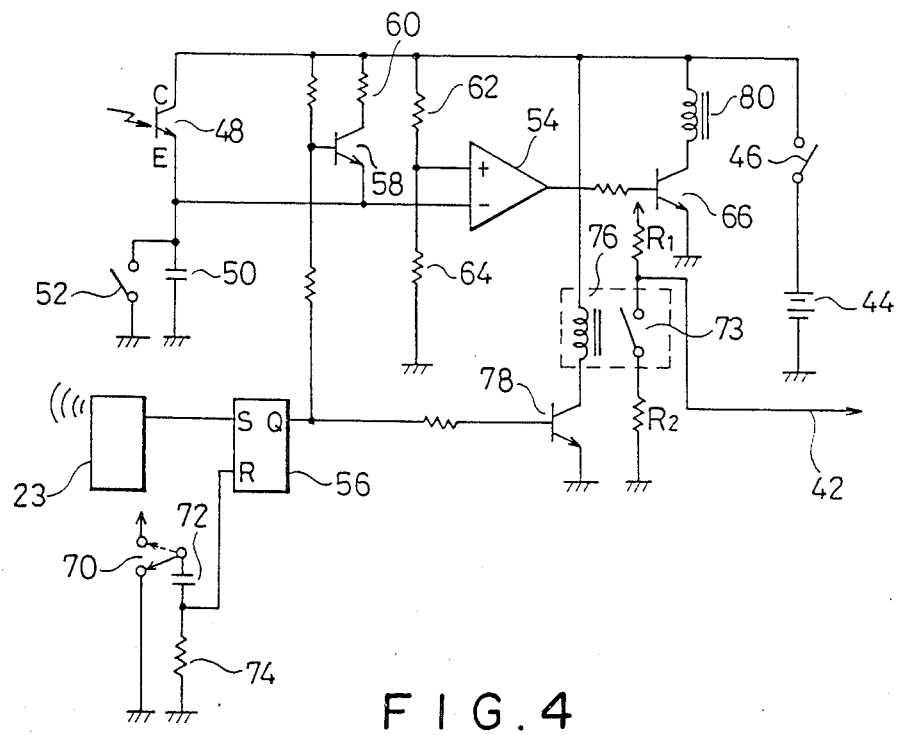
FIG. 3 is a circuit diagram showing the control circuit illustrated in FIG. 2.
Figure 4:
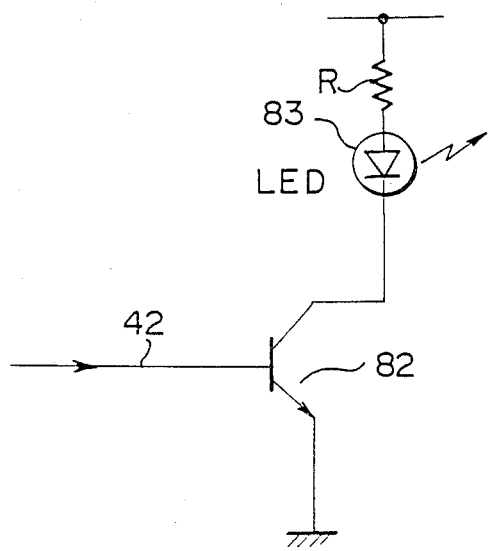
FIG. 4 is a circuit diagram showing the warning circuit.

The manner of giving a warning about the distance of the subject to be taken will hereunder be described in detail with the reference to FIGS. 3 and 4. FIG. 3 shows a control circuit for producing a signal (warning signal) to actuate a warning circuit shown in FIG. 4. In FIG. 3, a power source 44 is connected to a power switch 46 to be turned ON by a push-in to the intermediate position of a shutter release button, whereby push-in to the intermediate position of the shutter release button makes it possible to feed electric current to the circuit. A terminal E of a light receiving element 48 whose terminal C is connected to the power switch 46 is connected to a capacitor 50 to charge the same. Connected in parallel to the capacitor 50 is a normally closed switch 52 which is turned OFF by complete push-in of the shutter release button, to thereby initialize the capacitor 50. Voltage of this capacitor 50 is inputted to a minus terminal of the comparator 54. Furthermore, the capacitor 50 is connected to the power switch 46 through a transistor 58 and a resistor 60, which are turned OFF by high level (hereinafter referred to as "H level") outputted from a terminal Q of a flip-flop 56, and, when the transistor 58 is ON, another charging path to the capacitor 50 is given. A reference voltage is inputted to a plus terminal of the comparator 54 through resistors 62 and 64, and, when the voltage of the plus terminal is higher in value than the voltage of a minus terminal, the comparator 54 outputs H level to a transistor 66.

The distance measuring circuit 23 outputs signals in accordance with the case where the subject is located at a far-away position or at a close-in position. For example, when the subject is located within the predetermined distance, the signal remains on low level. However, when it is detected that the subject is located beyond the predetermined distance, the distance measuring sircuit 23 outputs H level, which is inputted to a terminal S of the flip-flop 56. Additionally, the predetermined distance is made to be about a distance, at which the face of a person being the subject occupies about 30% of the picture area taken.

Furthermore, a switch 70 is normally connected as indicated by a solid line, and connected as indicated by a broken line at the time of shutter release. Furthermore, a common terminal is grounded through a capacitor 72 and a resistor 74, and a terminal P of the flip-flop 56 is connected such that pulses differentiated by a capacitor 72 are inputted.

One of the terminals of a first solenoid 76 for being energized to turn OFF a strobe power source switch, not shown, is connected to the power source switch 46 and the other of the terminals is grounded through a transistor 78 which is turned ON by H level input of the Q output of the flip-flop 56. Further, simultaneously with turn-ON of the transistor 78, a switch 73 formed integrally with the first solenoid 76 in ON-operated. Furthermore, one of the terminals of a second solenoid 80 for being energized to hold the open state resulted from a mechanical operation of a shutter mechanism, not shown, is connected to the power switch 46, and the other of the terminals is grounded through the transistor 66 to be turned ON by a H level input from the comparator 54.

In the above circuit, push-in of the shutter release button to the intermediate position turns ON the power switch 46, the distance measuring circuit 23 is actuated to measure the distance to the subject, and at the same time, a reference voltage is given to the plus terminal of the comparator 54. On the other hand, the switch 52 is still closed, and a grounding potential is given to the minus terminal of the comparator 54. Accordingly, simultaneously with turn-ON of the switch 46, the comparator 54 outputs H level, and turns ON the transistor 66 to energize a second solenoid 80, to thereby be ready for holding the open state of the shutter mechanism. Additionally, the shutter mechanism is mechanically brought into the open state when the shutter release button is completely pushed in. Furthermore, during the shutter release operation, the switch 70 falls down to the side of the broken line instantaneously though, to thereby reset the flip-flop 56.

Subsequently, when the shutter release button is completely pushed in, the switch 52 is turned ON. However, since the capacitor 50 is not charged, the voltage of the minus terminal of the comparator 54 is low, the comparator 54 outputs H level, and the second solenoid 80 remains energized, whereby the open state of the shutter mechanism mechanically opened by the push-in is maintained. To charge the capacitor 50, there are provided a light receiving element 48 and the transistor 58, so that, due to a change in resistance of the above members, charging time of the capacitor 50, i.e. the time, during which the open state of the shutter mechanism is maintained, can be adjusted.

The arrangement of the warning circuit shown in FIG. 4 will hereunder be described. In FIG. 4, a light emitting diode 83 (hereinafter referred to as "LED") as a lamp is connected to a collector of a transistor 82 for receiving the warning signal 42 shown in FIG. 3 to be turned ON, and further, a protective resistor R for restricting electric current flowing through the LED 83 is connected in series to the LED 83. Furthermore, one end of the protective resistor R is connected to a power source line.

Now, when the subject is within the predetermined distance, an output from the distance measuring circuit 23 is on the low level (hereinafter referred to as "L level"), and the flip-flop 56 is not set. The flip-flop 56 is in the reset state, and the terminal Q of the flip-flop 56 is on the L level, whereby the transistor 58 is ON. Accordingly, the capacitor 50 is charged through the transistor 58 and the resistor 60, and further, charged through the light receiving element 48. Additionally, the internal resistance of the light receiving element 48 varies in accordance with the received light quantity, and, during the time before the capacitor 50 exceeds the reference voltage of the plus terminal of the comparator 54, the internal resistance varies in accordance with the received light quantity. After a predetermined time determined by the light quantity, when the voltage of the capacitor 50, i.e. the voltage at the minus terminal of the comparator 54 exceeds the reference voltage, an output from the comparator 54 comes to be on the L level, the transistor 66 is turned OFF, the second solenoid 80 is deenergized to bring the shutter mechanism into the closed state. Apart from this, the first solenoid 76 is not energized because an output from the flip-flop 56 is on the L level, the warning signal 42 is not outputted because the switch 73 is OFF, and the LED 83 of the warning circuit shown in FIG. 4 is not lighted up.

On the other hand, when the distance measuring circuit 23 is detected to be beyond the predetermined distance and the circuit 23 outputs H level, the flip-flop 56 is set, whereby the transistor 58 is turned OFF by an HL input from the flip-flop 56. As a consequence, the capacitor 50 is charged only by the current flowing through the light receiving element 48 in proportion to the received light quantity. Accordingly, the potential at the minus terminal of the comparator 54 becomes higher than the potential at the plus terminal thereof after a lapse of a predetermined time longer than when the distance measuring circuit 23 outputs L level. Furthermore, when the flip-flop 56 is set, the transistor 78 is turned ON by the H level from the flip-flop 56, whereby the first solenoid 76 is energized to stop the light emitted from the strobe. Furthermore, apart from this, the first solenoid 76 is energized to turn ON the switch 73 because an output from the flip-flop 56 is on the H level, whereby the warning signal 42 is outputted from the control circuit and the transistor 82 of the warning circuit shown in FIG. 4 received this warning signal 42 to be turned ON and current flows through the collector thereof, so that the LED 83 is lighted up.

In the above embodiment, when the distance to the subject is beyond the predetermined value, the lamp 83 is lighted up to issue an optical warning, however, an acoustic method such as electronic sounds, speech synthesis sounds and an acoustic buzzer may be adopted. Furthermore, the lamp need not necessarily be formed independently as in this embodiment, and may be provided in the finder.

Further, in the electronic still camera incorporating therein an electronic view finder, warning may be issued by flashing the picture screen of either a Braun tube or a liquid crystal display, or, warning may be issued by a lamp and an acoustic device, which are provided separately of the above members.

Furthermore, when the warning is issued by the lamp, the lamp need not necessarily be lighted up, and may be flashed.

In the above embodiment, when the subject is positioned beyond the predetermined distance, warning has been issued by the lamp and the like, however, the present invention need not necessarily be limited to this, and far-and-near distance information may be imparted through the finder 16 as shown below.

Figure 5:
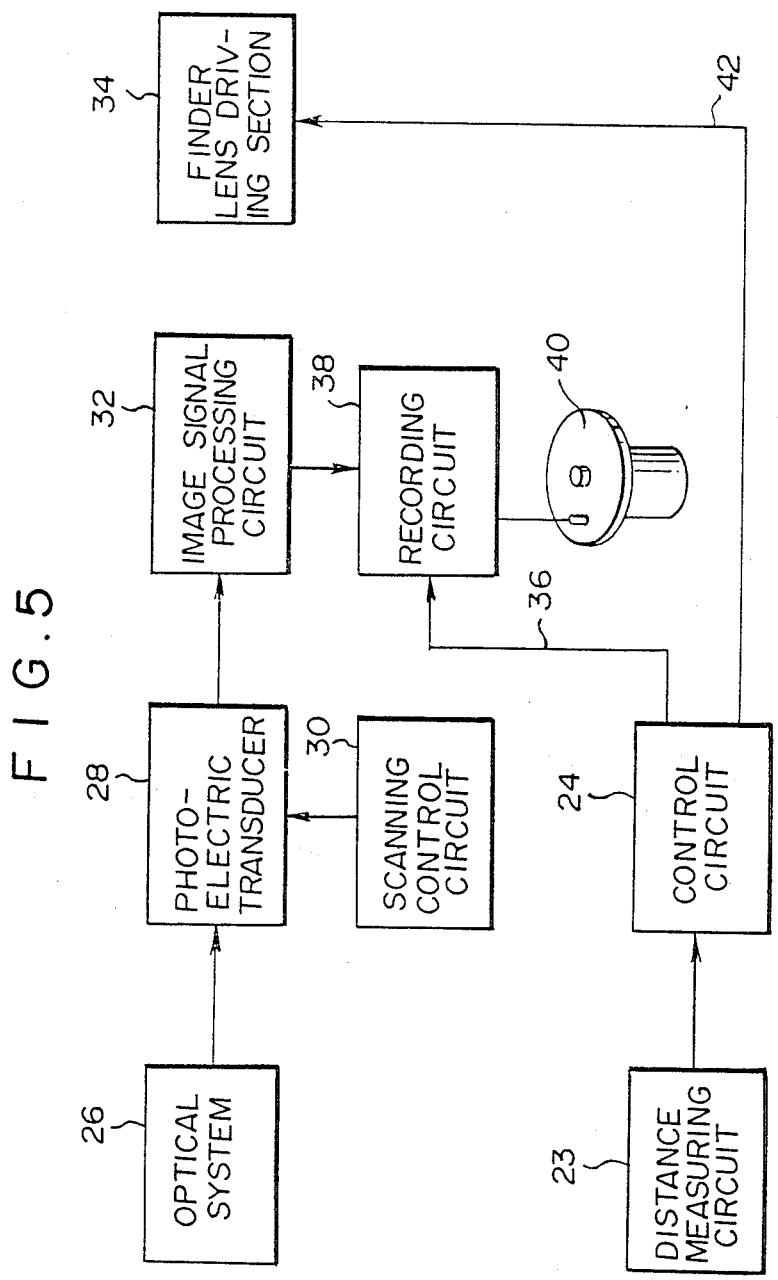
FIG. 5 is a block diagram showing another embodiment of the outlined electric circuit of the electronic still camera shown in FIG. 1.

FIG. 5 is a block diagram showing another embodiment of the electric circuit of the electronic still camera shown in FIG. 2. Additionally, same reference numerals are used to designate same or similar means corresponding to ones as shown in FIG. 2, so that the detailed description need not be repeated. This embodiment is different from the embodiment shown in FIG. 2 in that the latter uses the warning circuit 33, whereas, the former uses the finder lens driving section 34. More specifically, in response to a finder control signal 42 (a signal similar to the warning signal 42 in FIG. 2) outputted from the control circuit 24 when the distance to the subject exceeds the predetermined value, the finder lens driving section 34 performs a function of blurring the image of the subject in the finder, to thereby call the photographer's attention.

Figure 6:
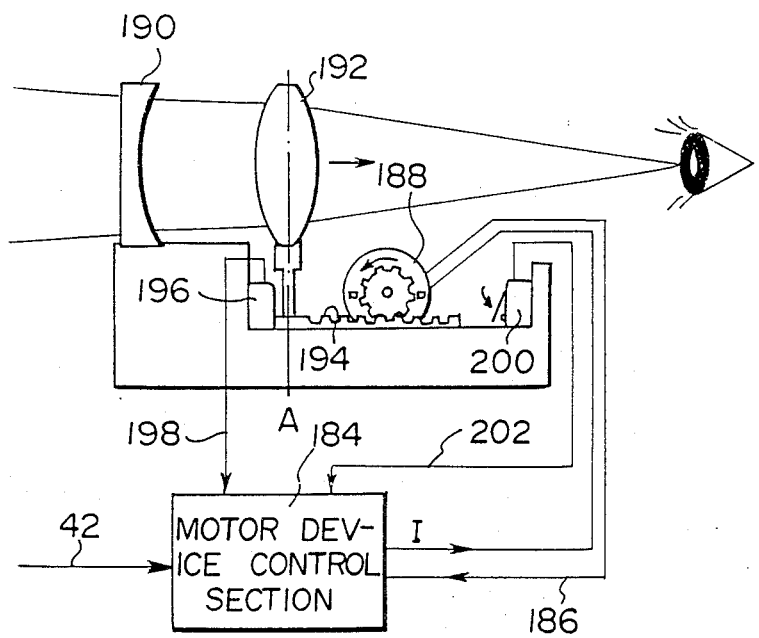
FIG. 6 is an explanatory view showing a finder lens driving section.

The arrangement of the finder lens driving section shown in FIG. 6 will hereunder be described. In FIG. 6, a motor drive control section 184 operable in response to the finder control signal 42 shown in FIG. 3 is provided, and this motor drive control section 184 rotatably drives a direct current motor 188 through a motor drive control line 186. Furthermore, the direct current motor 188 moves between two micro-switches an eye-piece 192 formed integrally with a rack 194 out of an objective lens 190 and the eye-piece 192, which are main components of the optical finder, while being restricted by output signals including a predetermined position detecting signal 198 from a predetermined position detecting micro-switch 196 and a limit signal 202 from a limit detecting micro-switch 200.

Now, when the subject is within the predetermined distance, the finder control signal is not outputted and current I does not flow through the motor drive control line 186 led out of the motor drive control section 184 of the finder lens driving section, so that the direct current motor 88 is not operated. As a consequence, the eye piece 192 holds a normal focal point A, so that the image of the subject can be inspected clearly.

On the other hand, when the distance to the subject is beyond the predetermined distance, the finder control signal 42 is outputted and the finder lens driving section causes the current I to flow through the motor drive control line 186 led out of the motor drive control section 184 in response to the finder control signal 42, whereby the direct current motor 188 is operated, so that the eye-piece 192 moves until the limit detecting signal 202 is outputted from the limit detecting micro-switch 200. As a result, the focus of the eye-piece 192 is considerably shifted from the normal focal point, whereby the image of the subject is blurred.

Additionally, in the above embodiment, when the distance to the subject is beyond the predetermined value, the focal point of the eye-piece 192 of the optical finder section is shifted to thereby blur the image of the subject, however, instead of this, the focal point of the objective lens 190 may be shifted.

Furthermore, means for displacing the eye-piece and the objective lens need not necessarily be limited to this embodiment. In place of the driving of the direct current motor, for example, the driving of the solenoid may be adopted in the region of the pulse motor. Further, the means for detecting the positions of the lenses need not necessarily be limited to the mechanical member such as the micro-switch, and an optical member may be used.

In the above embodiment, when the distance to the subject is beyond the predetermined value, the focal point of the finder lens is intentionally shifted to thereby inform the photographer of the far-and-near distance information of the subject. However, adopting of the electronic view finder as the finder makes it possible to easily blur the image of the subject in the finder.

Figure 7:
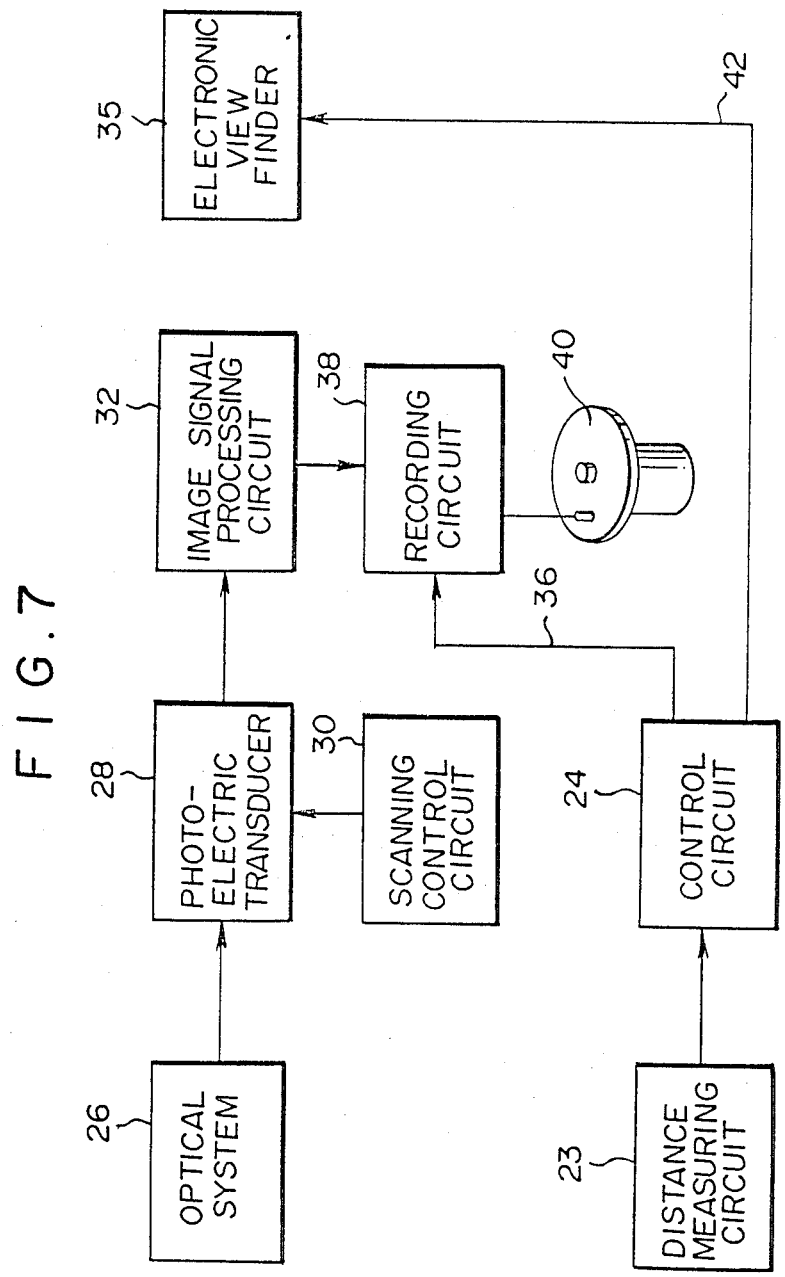
FIG. 7 is a block diagram showing a further embodiment of the outlined electric circuit of the electronic still camera shown in FIG. 1.

FIG. 7 is a block diagram showing a further embodiment of the electric circuit of the eletronic still camera shown in FIG. 2. Additionally, same reference numerals are used to designate same or similar means corresponding to ones as shown in FIG. 2, so that the detailed description need not be repeated. This embodiment is different from the embodiment shown in FIG. 2 that the latter uses the warning circuit 33, whereas the former uses the electronic view finder 35.

More specifically, the electronic view finder 35 inputs an image signal through the image signal processing circuit 32 to inform a monitored image on the screen of a Braun tube of the electronic view finder, whereas, a focas voltage 42 (a signal similar to the warning signal 42 in FIG. 2) is applied by the control circuit 24. Additionally, when the focus voltage of the electronic view finder 35 is lowered, the monitored image becomes blurred.

Figure 9:
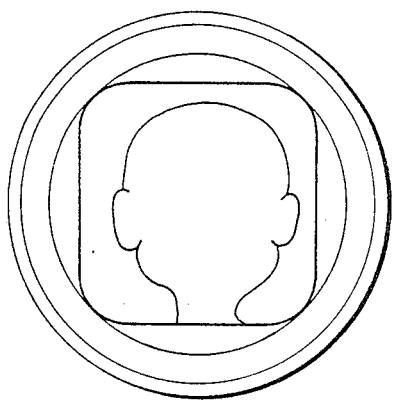

Now, when the sunject is within predetermined distance, the focus voltage 42 of the electronic view finder is not changed, and the monitored image can be formed clearly as shown in FIG. 9.

Figure 8:
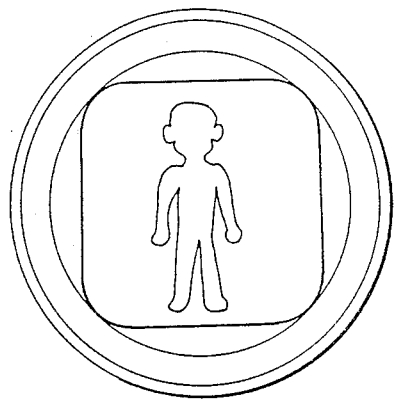
FIGS. 8, 9 and 10 are explanatory view showing the screen of the electronic view finder section.
Figure 10:
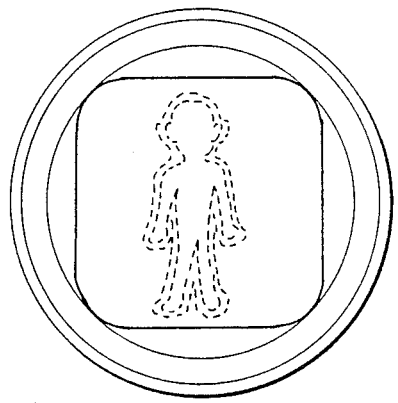

On the other hand, when the subject is beyond the predetermined distance, the switch 73 (Refer to FIG. 3) is turned ON, whereby the focus voltage 42 of the electronic view finder is divided by $R_1$ and $R_2$, so that the focus voltage is lowered and the monitored image shown in FIG. 8 is blurred as shown in FIG. 10.

In each of the above embodiments, during the portrait photographing, when the subject is beyond the predetermined distance, the warning is issued to call the photographer's attention to a close-in taking. The camera wherein an automatic zoom-up taking is performed in the above-described case will hereunder be described.

Figure 11:
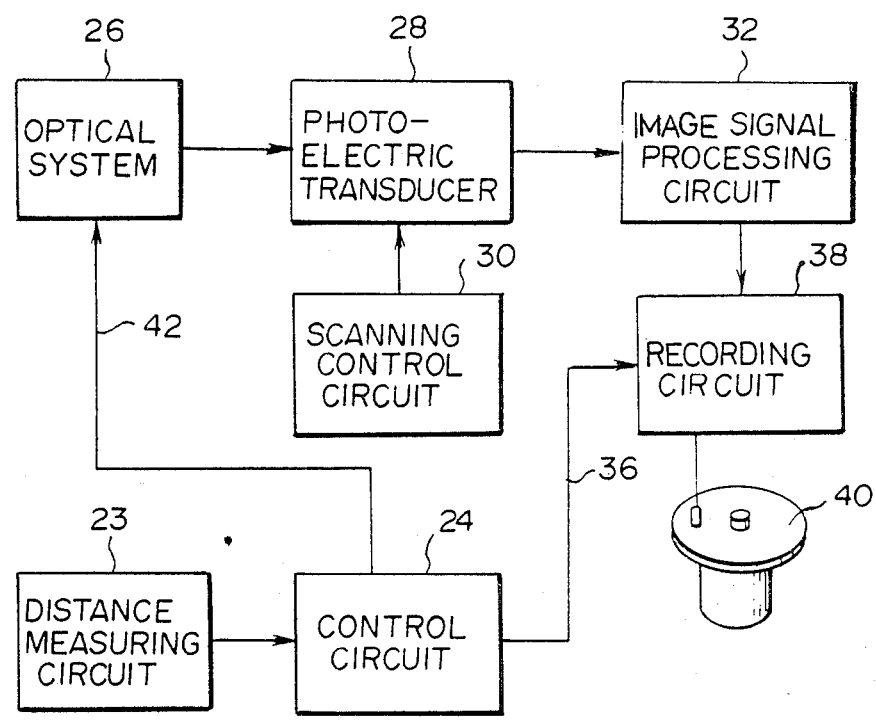
FIG. 11 is a block diagram showing a still further embodiment of the outlined electric circuit of the electronic still camera shown in FIG. 1.

FIG. 11 is a block diagram showing another embodiment of the electric circuit of the magnetic still camera shown in FIG. 2. Additionally, same reference numerals are used to designate same or similar means corresponding to ones as shown in FIG. 2, so that the detailed description need not be repeated. This embodiment is different from the embodiment shown in FIG. 2 in that the latter uses the warning circuit 33, whereas, in the former, a zoom lens forcibly driving signal 42 (a signal similar to the warning signal 42 in FIG. 2) is applied to the optical system 26 from the control circuit 24. Needless to say, it is a prerequisite that an automatic zoom-up mechanism is provided on the camera.

Figure 12:
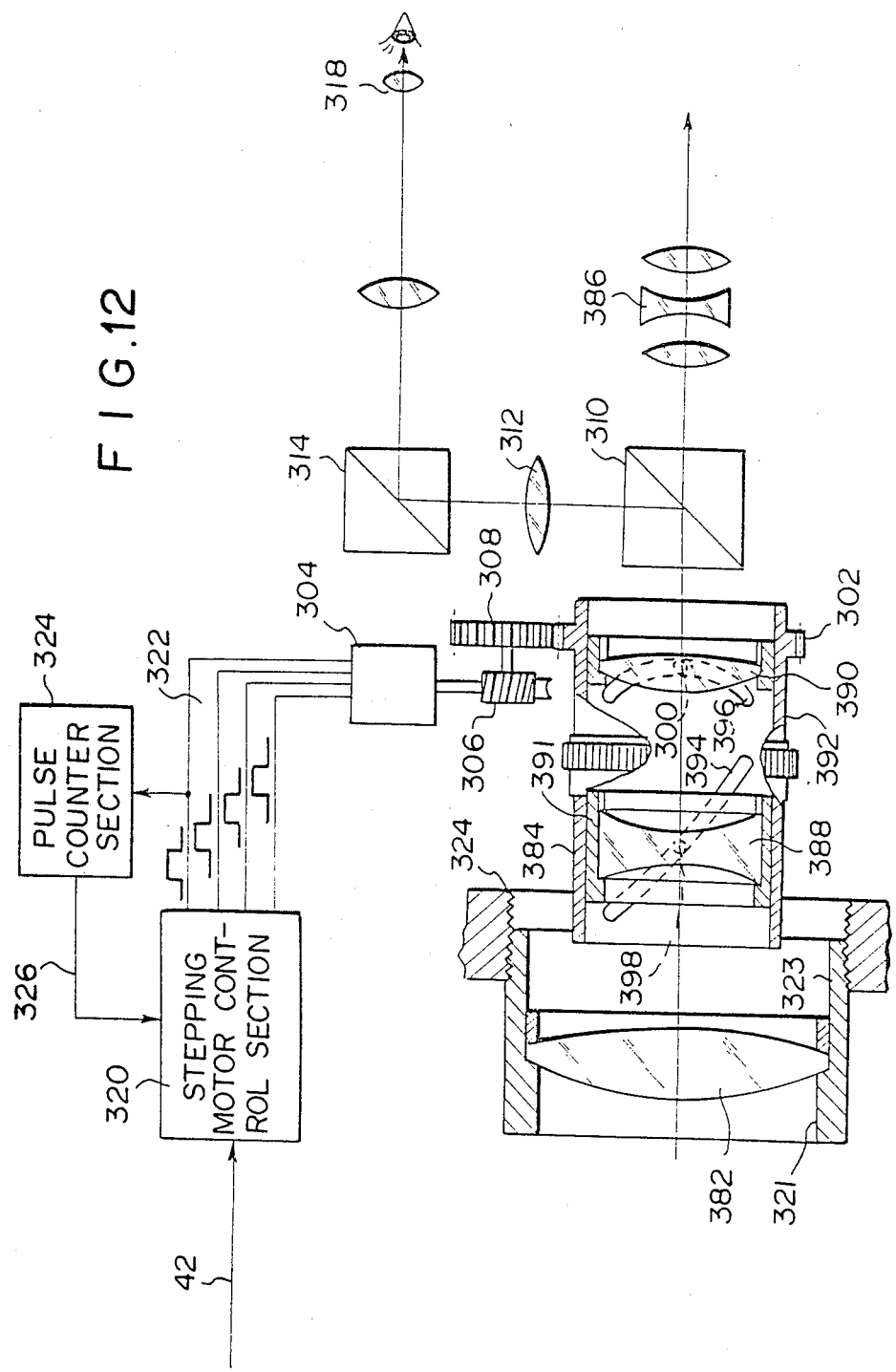
FIG. 12 is an explanatory view showing the optical system.
Figure 13:
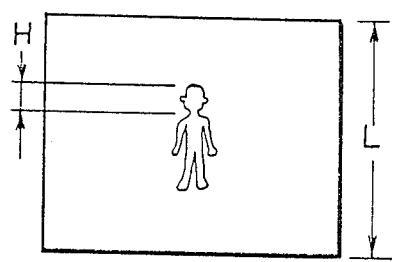
FIG. 13 is an explanatory view showing the photo print.
Figure 15:
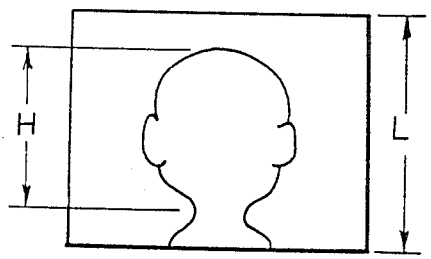
FIG. 15 shows the TV screen.
Figure 14:
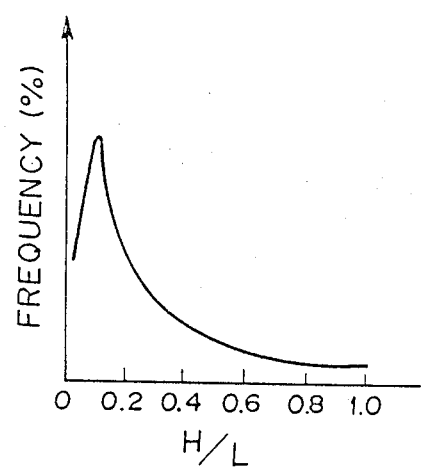
FIG. 14 is an explanatory view showing the rate, at which the face of the subject to be taken as shown in FIG. 13 occupies a space.
Figure 16:
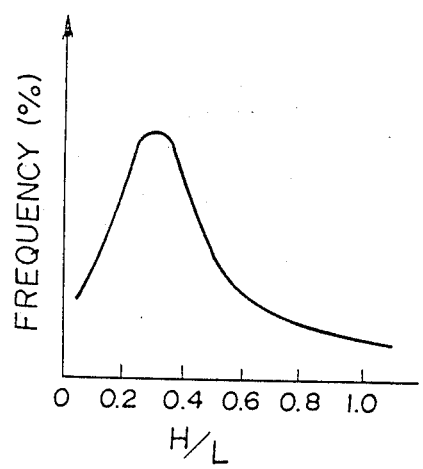
FIG. 16 is an explanatory view showing the rate, at which the face of the subject to be taken as shown in FIG. 15 occupies a space.

The arrangement of the optical system shown in FIG. 12 will hereunder be described. The optical system includes groups of zoom lens an automatically focusing mechanism section. The arrangement thereof will hereunder be described.

First, the groups of zoom lens include a front lens 382, a group 384 of adjust lenses and a group 386 of lenses. Of these lenses, the groups 384 of adjust group is constituted by two lenses 388 and 390, both of which are movable in the direction of optical axis. An outer tube 392 is provided on the inner surface thereof with cam grooves 394 and 396, in which are positioned pins 398 and 300, which are projected from lens holding tubes of the lenses 388 and 390. Rotation of the outer tube 392 changes the magnification, however, an image of the subject to be taken is formed at a predetermined position at all times. Furthermore, to perform focusing of the groups of zoom lenses, the lens 382 is movable in the direction of optical axis, while being operationally associated with the group 384 of adjust lenses. Formed on the lens holding tube 321 of the front lens 382 are external threads 323, which are threadably coupled into stationary internal threads 324 of the main body of the camera.

On the other hand, a half mirror type prism 310 is interposed between the group 384 of adjust lenses and the group 386 of lenses. An incident beam branched by this half mirror type prism 310 is adapted to fall into a finder optical system having a lens 312. Furthermore, to form an optical axis in parallel to the optical axis of the groups of zoom lenses in the finder, a total reflection type prism 214 is provided, whereby the image of the subject to be taken can be inspected through an eyepiece 318.

The incident beam passing through the half mirror type prism 310 reaches a charge coupled device (CCD), not shown, through the group 386 of lenses.

Now, zoom driving in the zoom lens device of the type. described is performed by an electromotion such as a motor in general, and one of such examples is a stepping motor 304 as shown. This stepping motor 304 can be operated by delivering an UP pulse signal and a DOWN pulse signal, which are different in phase from each other, to an exciting coil. In this embodiment, the stepping motor is controlled by a stepping motor control section 320 operable in response to the zoom lens forcibly driving signal 42 as shown in FIG. 11, and further, controlled in response to a signal, not shown, from the distance measuring circuit as well. Furthermore, a pulse counter section 124 for detecting a portion of a signal line 322 led out of the stepping motor control section 320 counts pulse signals and, when the pulse signals thus counted reach a predetermined number, applies an interrupt signal 326 to the stepping motor control section 320 to stop the pulse signals from being outputted.

Now, when the subject is within the predetermined distance, the zoom lens forcibly driving signal 42 is not issued, the stepping motor control section 320 of the optical system is operated only in response to a signal from the distance measuring circuit, and delivers pulse signals of the predetermined number for the ordinary automatic focusing. As a consequence, the size of the image of the subject seen through the optical finder remains unchanged.

On the other hand, when the distance to the subject is beyond the predetermined distance, the zoom lens forcibly driving signal 42 is outputted, the stepping motor control section 320 receives the above signal and does not receive the signal from the distance measuring circuit, and delivers pulse signals of the predetermined number for forcibly zoom-up driving the zoom lenses to the stepping motor 304, so that the zoom-up taking of the subject can be performed.

Additionally, in the above embodiments, when the distance to the subject is beyond the predetermined distance, the zoom-up is unambiguously effected, however, such an arrangement may be adopted that zoom-up is made at a required magnification such that the face portion of the person as being the subject occupies about 30% of the taken picture area in accordance with the distance to the subject.

What is claimed is:
1. A camera comprising:
an optical finder section for ascertaining a scope for photographing a subject;
means for measuring an object distance to said subject to be photographed; and
an optical system including a mechanism for automatically focusing a taking lens in response to an output signal from said means for measuring a distance;
wherein said taking lens is comprised of zoom lenses, and said camera further comprises means for outputting a zoom lens driving signal when the object distance to the subject, which is measured by, said distance measuring means, is beyond a predetermined value at which it becomes difficult to identify a face of the subject taken by said camera, and control means for driving a zoom lens mechanism in response to input of said zoom lens driving signal.

2. A camera comprising:
means for measuring an object distance to a subject to be photographed; and
a mechanism for automatically focusing a taking lens in response to an output signal from said means for measuring a distance:
wherein said camera further comprises:
first warning means for issuing a warning signal when the object distance to said subject, which is measured by said distance measuring means, is beyond a predetermined value at which it becomes difficult to identify a face of the subject; and
second warning means for issuing a warning in response to said warning signal.

3. The camera as set forth in claim 2, wherein said camera is an electronic still camera including:
a solid state image sensing device provided on an image forming surface; and
means for recording an image signal from said solid state image sensing device into a recording medium.

4. The camera as set forth in claim 3, wherein said recording medium is a magnetic disc.

5. The camera as set forth in claim 2, wherein said second warning means issues a warning through a warning lamp.

6. The camera as set forth in claim 2, wherein said second warning means issues a warning through sound generating means.

7. The camera as set forth in claim 2, wherein said camera includes an objective lens and an eye-piece, and further, has an optical finder section.

8. The camera as set forth in claim 7, wherein said warning means is means for shifting the focal point of at least one of the lenses out of said objective lens and said eye-piece, to thereby blur the image of said subject seen through said optical finder section.

9. The camera as set forth in claim 2, wherein said camera includes:
a solid state image sensing device provided on an image forming surface; and
an electronic view finder section for monitor-displaying said subject in response to an image signal from said solid state image sensing device.

10. The camera as set forth in claim 9, wherein said warning device is means for changing a focus voltage of said electronic view finder section, to thereby blur a monitored image.

11. The camera as set forth in claim 2, wherein said first warning means issues a warning signal when the object distance to the subject is beyond the object distance necessary for the longitudinal length of a head of the subject to occupy about 30% of the longitudinal length of a picture area displaying the subject to be photographed.

* * * * *